(12) United States Patent
Gupta

(10) Patent No.: US 10,237,276 B2
(45) Date of Patent: Mar. 19, 2019

(54) MANAGING ACCESS RIGHTS TO A GROUP DIRECTORY

(71) Applicant: Diro, Inc., Anaheim, CA (US)

(72) Inventor: Vishal Gupta, Delhi (IN)

( * ) Notice: Subject to any disclaimer, the term of this patent is extended or adjusted under 35 U.S.C. 154(b) by 110 days.

(21) Appl. No.: 15/124,022

(22) PCT Filed: Mar. 9, 2015

(86) PCT No.: PCT/US2015/019443
§ 371 (c)(1),
(2) Date: Sep. 6, 2016

(87) PCT Pub. No.: WO2015/138320
PCT Pub. Date: Sep. 17, 2015

(65) Prior Publication Data
US 2017/0012987 A1    Jan. 12, 2017

Related U.S. Application Data

(60) Provisional application No. 62/080,396, filed on Nov. 16, 2014, provisional application No. 61/994,949, (Continued)

(51) Int. Cl.
*G06Q 10/10* (2012.01)
*H04L 29/06* (2006.01)
(Continued)

(52) U.S. Cl.
CPC ...... *H04L 63/102* (2013.01); *G06F 17/30091* (2013.01); *G06Q 10/10* (2013.01);
(Continued)

(58) Field of Classification Search
None
See application file for complete search history.

(56) References Cited

U.S. PATENT DOCUMENTS 7,743,024 B2 * 6/2010 Mandre .................. G06Q 10/00
707/620
8,234,374 B2 * 7/2012 Marcjan .............. G06F 21/6218
709/205

(Continued)

FOREIGN PATENT DOCUMENTS

KR    2012137632 A1    12/2012

OTHER PUBLICATIONS

STIC Search Strategies (Year: 2018).*
International Application No. PCT/US2015/019443, International Search Report dated Jun. 18, 2015, 3 pages.

*Primary Examiner* — Sharon S Lynch
*Assistant Examiner* — F J Farhadian

(57) ABSTRACT

Systems and methods for group-sourced contacts directories are presented. A first member of a shared contacts directory can add contact information of a second user to the directory. Upon addition of the contact information of the second user, the contacts directory discovery system automatically sends a notification to the second user and provides the second user editing rights to the contact information of the directory. Changes made in the directory is automatically synchronized to the across the user devices associated with the members of the directory.

5 Claims, 4 Drawing Sheets

Related U.S. Application Data filed on May 18, 2014, provisional application No. 61/950,163, filed on Mar. 9, 2014.

(51) Int. Cl.
*G06Q 50/00* (2012.01)
*G06F 17/30* (2006.01)

(52) U.S. Cl.
CPC ........... *G06Q 10/107* (2013.01); *G06Q 50/01* (2013.01); *H04L 63/108* (2013.01)

(56) References Cited

U.S. PATENT DOCUMENTS

| | | | | |
|---|---|---|---|---|
| 2005/0091316 A1* | 4/2005 | Ponce | ................... | H04L 63/104 709/205 |
| 2005/0197871 A1* | 9/2005 | Mendonca | ........... | G06Q 10/107 705/7.19 |
| 2008/0046478 A1* | 2/2008 | Mandre | ................. | G06Q 10/00 |
| 2008/0097999 A1* | 4/2008 | Horan | .................... | G06Q 10/10 |
| 2008/0292080 A1* | 11/2008 | Quon | .................. | G06Q 10/109 379/201.02 |
| 2009/0017790 A1* | 1/2009 | Thalapaneni | ..... | H04L 29/12047 455/410 |
| 2010/0254525 A1* | 10/2010 | Maly | ....................... | H04M 1/67 379/207.03 |
| 2012/0089644 A1* | 4/2012 | Doggett | ............... | G06Q 10/109 707/780 |
| 2013/0226958 A1* | 8/2013 | Pianko | ............. | G06F 17/30581 707/769 |
| 2014/0019531 A1* | 1/2014 | Czajka | ................ | G06Q 10/107 709/203 |
| 2014/0025683 A1* | 1/2014 | Howland | .......... | G06F 17/30598 707/740 |
| 2014/0066044 A1* | 3/2014 | Ramnani | ................ | H04W 8/24 455/418 |
| 2014/0357238 A1* | 12/2014 | Efrati | ..................... | H04W 4/16 455/414.1 |
| 2018/0012481 A1* | 1/2018 | Mendonca | ............. | G06Q 40/04 |

* cited by examiner

MANAGING ACCESS RIGHTS TO A GROUP DIRECTORY

This application is a U.S. National Stage of International Application No. PCT/US2015/019443, filed Mar. 9, 2015, which claims the benefit of priority to U.S. Provisional Patent Application No. 61/950,163 filed Mar. 9, 2014, U.S. Provisional Patent Application No. 61/994,949 filed May 18, 2014, and U.S. Provisional Patent Application No. 62/080,396 filed Nov. 16, 2014, the contents of which are incorporated herein by reference in their entireties. Where a definition or use of a term in a reference that is incorporated by reference is inconsistent or contrary to the definition of that term provided herein, the definition of that term provided herein is deemed to be controlling.

FIELD OF THE INVENTION

The present disclosure relates to methods and systems for managing group-sourced contacts directories.

BACKGROUND

The following description includes information that may be useful in understanding the present invention. It is not an admission that any of the information provided herein is prior art or relevant to the presently claimed invention, or that any publication specifically or implicitly referenced is prior art.

With the advent of smart phones and various online social networks, it is desirable to have contact information available at a click of a button. Often times, people store information of known contacts on their smart phones in an organized format such as in one or more contact directories. However, it can be very difficult for one to know (and then store) contact information of all persons whom one desires to be able to contact. Contact information also changes from time to time (e.g., people changing their phone numbers or email addresses, etc.). Thus, managing and updating contact directories can be challenging and time-consuming.

Effort has been directed to solve the above problems by generating shared contact lists. For example, U.S. Pat. No. 7,743,024 to Mandre ("Mandre") titled "Synchronizing Contacts" discloses a peer-to-peer method of synchronizing the contact information of a group of users between the group of users over a communication network. In Mandre, a user belonging to the group of users can select contact information of other users and invite other users to synchronize the contact information with each other.

Similarly, U.S. Patent Application No. 2014/0,066,044 to Ramnani ("Ramnani") titled "Crowd-sourced contact information and updating system using artificial intelligence" discloses a method and system for crowd sourcing and managing contact and profile information of a user's contacts. In Ramnani, any individual in the group can make changes in his or her contact lists. When the changes in individual's contact list are made, the crowd-sourced contact list can be automatically updated and populated based on contributed information by the individual. Ramnani also discloses that the crowd-sourced contact list can also be edited, added or updated by users of the crowd-sourced contact list. Yet, the changes made in the crowd-sourced contact list may be differently weighed based on the identity of the users. However, neither Mandre nor Ramnani expands shared contact lists by adding contact information of a person or an entity, which does not belong to the group.

Others have made efforts to expand shared contact lists by adding contact information of a person or entity, which is not a member of the shared group. For example, U.S. Patent Application No. 2008/0,292,080 to Quon ("Quon") titled "System and method for adding and associating users on contact address book" discloses a service to allow a service user to add other service users and non-users into the service user's address book based on contact telephone numbers. In addition, Quon provides a method of associating the service users based on user contact number by comparing sets of contact information between users. Thus, when a portion of the set of contact information of one user matches the information related to another user, those two users are associated by virtue of having each other's contact information in their contact lists. However, Quon's association system is limited to comparing contact information between users and associating one user with another.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for an improved contact lists management system that allows contact information to be updated and maintained automatically.

SUMMARY OF THE INVENTION

The inventive subject matter provides apparatus, systems and methods in which directories of contacts are group-sourced and shared among members of the directories, and automatically updated using contacts stored within the members' devices.

An aspect of the inventive subject matter relates to a group-sourced contact directory discovery system. In such a group-sourced contact directory discovery system, contact information of contact directories is group-sourced. A contact directory includes contact information of multiple members of the directory. In some embodiments, all members within a group-sourced directory have access to the contact information of the directory. Specifically, each member of the directory can add new contacts (add new members) to, remove contacts (remove members) from, and edit contact information of any contact within the directory.

In addition, when a new contact is added to a directory, the new contact automatically becomes a member of the directory. The new member is notified of his/her inclusion to the directory. In some embodiments, the new member is provided access to the contact information of other members in the directory, such that the new member can edit his/her own contact information or other members' contact information within the directory.

In some embodiments, the system includes a contacts directory database and a discovery engine. The group-sourced contacts directory database stores a contact directory comprising a first contact associated with a first person. The discovery engine comprises a processor, and further comprises a memory storing program instructions. When executed by the processor, the instructions cause the processor to: provide a first interface that enables the first person to add a second contact associated with a second person to the contact directory, and based on the addition of the second contact to the contact directory, (1) automatically transmit a notification to a user device associated with the second person and (2) provide the second person with editing rights to all contacts included in the contact directory, wherein the notification comprises information regarding the contact directory. The contact list may have been inaccessible by the second person before the second contact was added to the contact directory In some embodiments, the editing rights comprise a right to add a new, third contact to the contact directory. In some embodiments, the editing rights comprise a right to remove the first contact from the contact directory. In some embodiments, the editing rights comprise a right to edit contact information associated with the first contact.

The addition of the second contact may include adding contact information related to the second contact, wherein the contact information includes a phone number. In some embodiments, contacts are smartphone or cell phone contacts, each including a phone number and email address.

The instructions may further cause the processor to: receive a request to add a third contact associated with a third person to the contact directory; and based upon the addition of the third contact to the contact directory, (1) automatically transmit a notification to a user device associated with the third person and (2) provide the third person editing rights to all contacts included in the contact directory, wherein the notification comprises information regarding the contact directory. The request may be received from either the first person or the second person.

The instructions may further cause the processor to: receive a request to remove the first contact from the contact directory; and upon the removal of the first contact from the contact directory, remove editing rights of the contact list from the first person. The request may be received from the second person.

Another aspect of this disclosure relates to computer-implemented method of managing contact directories, including to: receive contact information related to a new user of a discovery engine in a group-sourced contacts directory ecosystem; select a unique identifier from the contact information; and search a contacts directories database for the unique identifier to identify a contact directory in which contact information for a contact in the contact directory includes the unique identifier. For an identified contact directory, the method includes to provide information regarding the identified contact directory to a user device associated with the new user; and grant editing rights to the new user, thereby allowing the new user to edit information in the identified contact directory.

The identified contact directory may be a shared contact directory, where multiple persons represented by contacts in the shared contact directory are members of the contact directory, and each member has a right to edit contact information in the shared contact directory. In some embodiments, the editing rights comprise a right to add a contact to the shared contact directory. In some embodiments, the editing rights comprise a right to remove a contact from the shared contact directory. In some embodiments, the method includes to reconcile a conflict arising from inconsistent edits by two or more members.

In some embodiments, the identified contact directory is associated with context criteria. In such embodiments, the method includes receiving a personal contact directory from the new user, wherein at least one contact in the personal contact directory is associated with at least one attribute; identifying a subset of contacts in the personal contact directory that satisfies the context criteria by comparing the at least one attribute of the contacts in the personal contact directory with the context criteria; automatically updating the shared contact directory by adding the subset of the contacts to the shared contact directory; and automatically synchronizing the shared contact directory with copies of the shared contact directory. The subset of contacts may include an added contact associated with an added member, wherein the method further includes providing the added member a right to edit the shared contact directory. In some embodiments, the shared contact directory may be inaccessible to the added member before the subset of contacts was added to the shared contact directory.

In some embodiments, contact information of a first member is used to determine a location of the first member. In some embodiments, the location of the first member is used to determine a local time of the first member.

Another aspect of this disclosure is a discovery engine, comprising a memory including processor-readable instructions; and a processor configured to read the instructions and execute the instructions. When executed, the instructions cause the processor to: receive from a first member of a shared contact directory a first contact information update related to a first contact in the shared contact directory; receive from a second member of the shared contact directory a second contact information update related to the first contact in the shared contact directory; identify that the first contact information update is in conflict with the second contact information update; and select one of the first contact information update and the second contact information update to retain as a retained update. The instructions further cause the processor to edit the shared contact directory with the retained update; store the shared contact directory with the retained update as a new version of the shared contact directory; and synchronize copies of the shared contact directory to the new version.

In some embodiments, the instructions further cause the processor to associate a first time stamp with the first contact information update; associate a second time stamp with the second contact information update; compare the first time stamp and the second time stamp, and select the update to retain based on the comparison.

In some embodiments, the retained update is the first contact information update, where the instructions cause the processor to: after receiving the first contact information update, create a first update version by editing the shared contact directory with the first contact information update, and synchronize the copies of the shared contact directory; after receiving the second contact information update, create a second update version by editing the shared contact directory with the second contact information update, and synchronize the copies of the shared contact directory; and after selecting the first contact information update as the retained update, edit the shared contact directory with the retained update by rewinding to the first update version.

In some embodiments, the instructions further cause the processor to add a keyword from the second contact information update to a negative keyword list.

In another aspect of the inventive subject matter, systems and methods for automatically updating contacts directories based on existing contact information stored on a member's device is disclosed. In some embodiments, each contacts directory comprises contact information and context criteria that define which contacts or which members belong to the directory. In some of these embodiments, when a member is part of a contacts directory, a contacts directory management engine being executed on a device associated with the member is programmed to analyze existing contacts stored in the device, determine which of the existing contacts should belong to the directory by comparing the context criteria of the directory against the attributes associated with the existing contacts, and update the directory with existing contacts having attributes that satisfy the context criteria.

In some embodiments, the inventive subject matter includes a method of managing contacts directories stored on a computing device. Disclosed method includes a step of obtaining a directory of contacts. The directory includes contact information of members of the directory. The directory further includes context criteria that defines which contacts or which members should belong to the directory.

The method further includes a step of retrieving a personal contact list from a device associated with a member of the directory. In some embodiments, each contact from the contact list is associated with at least one attribute. Once the personal contact list is retrieved, the method continues by comparing the at least one attribute of each contact in the list against the context criteria, and identifying a subset of the contacts that satisfies the context criteria.

In some embodiments, the directory are shared and synchronized among the members of the directory. In these embodiments, the method uses the same process described above to analyze the existing contacts in the devices associated with each member of the directory and update the directory on the devices accordingly. The method then synchronizes the local copies of the directory on each device such that the new contacts retrieved from each device are added to all local copies of the directory.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
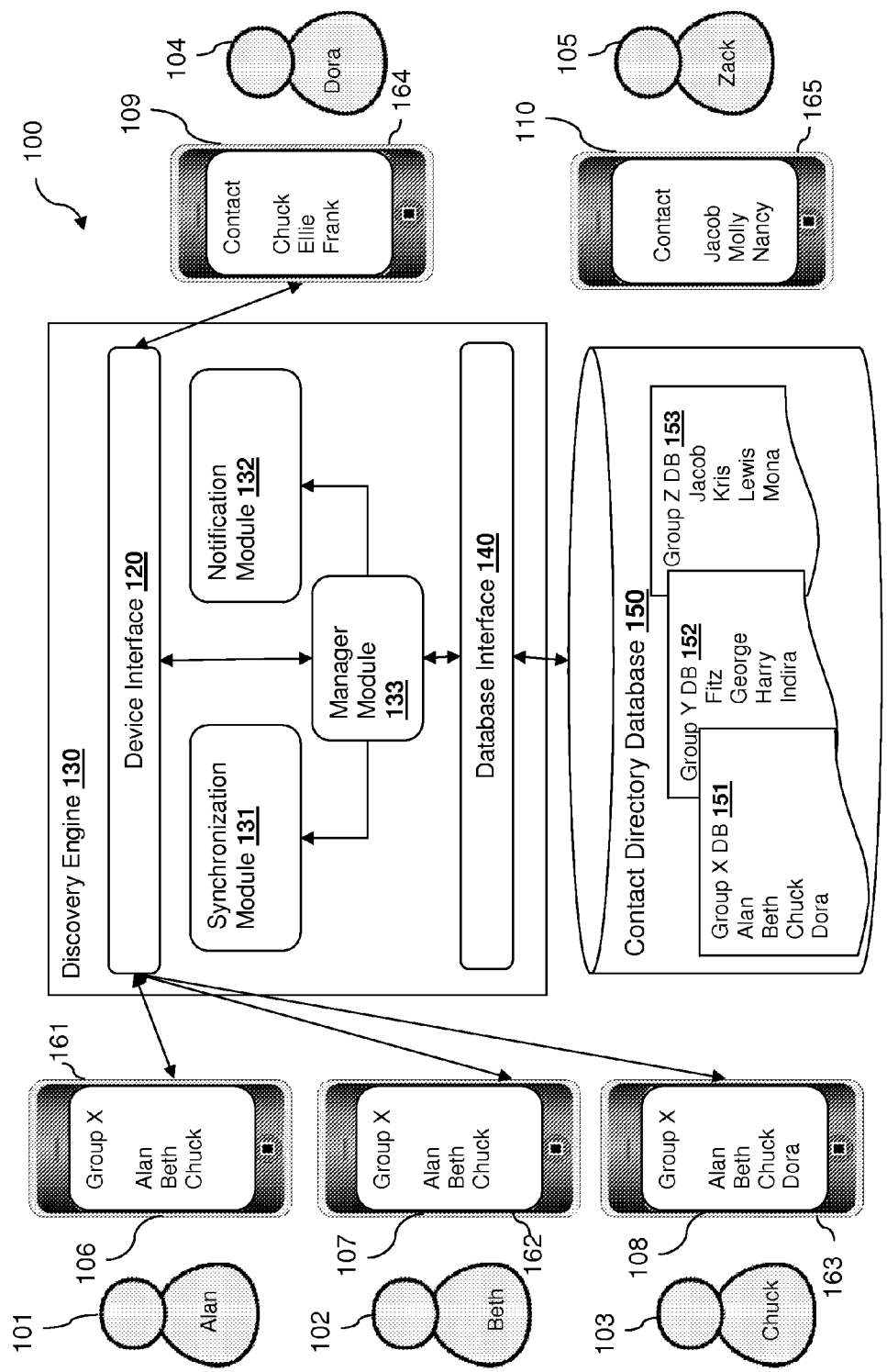
FIG. 1 illustrates a contacts directory discovery ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

The terms "configured to" and "programmed to" in the context of a processor refer to being programmed by a set of software instructions to perform a function or set of functions.

One should appreciate that the disclosed contacts directory discovery system provides numerous advantageous technical effects. For example, the contacts directory discovery system of some embodiments enables up-to-date contact information by methodically allowing the persons to update and edit contacts and contact information in shared directories.

The following discussion provides many example embodiments. Although each embodiment represents a single combination of components, this disclosure contemplates combinations of the disclosed components. Thus, for example, if one embodiment comprises components A, B, and C, and a second embodiment comprises components B and D, then the other remaining combinations of A, B, C, or D are included in this disclosure, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, numerical parameters expressing quantities are used. It is to be understood that such numerical parameters may not be exact, and are instead to be understood as being modified in some instances by the term "about." Accordingly, in some embodiments, a numerical parameter is an approximation that can vary depending upon the desired properties sought to be obtained by a particular embodiment.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

Methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the described concepts and does not pose a limitation on the scope of the disclosure. No language in the specification should be construed as indicating any non-claimed essential component.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

This disclosure allow for construction or configuration of a computing system or device to operate on vast quantities of digital data, beyond the capabilities of a human. The computing system or device is able to manage the digital data in a manner that could provide utility to a user of the computing system or device that the user would lack without such a tool.

The inventive subject matter provides apparatus, systems and methods in which directories of contacts are group-sourced and shared among members of the directories, and automatically updated. A contact directory in this disclosure refers to a listing of one or more contacts, where each contact represents a person (where "person" herein refers to a particular human, corporation, or other entity). Each contact may be associated with one or more entries of contact information, such as, for example, phone number, email address, physical address, social network name (e.g. name used on Twitter), domain name, or URL. Each contact may also be associated with one or more attributes, such as, for example, location, school, employer, position, or relationship. The persons represented by the contacts in a directory are designated as members of that directory.

Group sourcing in this disclosure refers to the ability of multiple persons to contribute to content. With respect to content of a contact directory as described by this disclosure, there may be a limited number of persons that are allowed to contribute to the content for the directory. For example, the persons allowed to contribute to the content of a directory may be limited to all members of the directory, or to certain members of the directory.

A person may have more than one contact directory, and a contact may be listed in more than one directory. Further, if a contact is listed in more than one directory, the contact information and the attributes of the contact may be different in the different directories.

In some embodiments, all members of a group-sourced contact directory have access to the contact information in the directory. Specifically, each member of the contact directory can add new contacts to (thereby increasing the number of members of the directory), remove contacts from (thereby reducing the number of members of the directory), and edit contact information of any contact within the directory.

In addition, when a new contact is added to a contact directory, the person represented by the new contact automatically becomes a new member of the directory. The new member is notified of inclusion in the directory. In some embodiments, the new member is provided access to the contact information of other members in the directory, such that the new member can edit not only his/her/its own contact information, but also other members' contact information within the directory.

One aspect of the inventive subject matter includes a group-sourced contact directory discovery system. The system includes a contact directory database storing multiple contact directories. Each contact directory includes contact information associated with one or more persons (members). The system further includes a discovery engine. The discovery engine includes a processor and a memory storing program instructions, which when executed by the processor cause the processor to implement an embodiment of the group-sourced contacts directory discovery system. In some embodiments, the discovery engine is programmed to provide an interface on a device (e.g., a smart phone) associated with a member of a directory, that enables the member to add a new contact to the directory, and/or to add or edit contact information for a contact (e.g., a telephone number, an email address, a social network identifier (ID), etc.). When a new contact is added to the directory, the person represented by the newly added contact becomes a new member of the directory as a result of the inclusion of the new contact. Upon the addition of this new member, the discovery engine is programmed to automatically transmit a notification to a device associated with the new member. In some embodiments, the notification includes a text or voice message indicating that the new member is being added to the directory. In some embodiments, such notification may further provide information about the directory (e.g., name of the directory, attributes of the directory, etc.).

Additionally, the discovery engine is programmed to provide the new member with editing rights to the directory. In some embodiments, the editing rights are identical to the editing rights of some of, or all of, the other members of the directory, which editing rights include a right to add new contacts to the directory, a right to remove contacts from the directory, and a right to edit contact information in the directory.

FIG. 1 is a diagram of some embodiments of a group-sourced contacts directory ecosystem 100 according to the inventive subject matter. The ecosystem 100 includes multiple user devices 106-110 associated with persons 101-105, respectively. The user devices 106-110 are portable devices that the persons 101-105 use for storing contact information.

The ecosystem 100 also includes a discovery engine 130, which is coupled with the user devices 106-110 via a device interface 120. In some embodiments, the discovery engine 130 is implemented on one or more computing devices having a memory that stores programming instructions, that when executed by the processor(s) of the one or more computing devices, causes the processor(s) to perform functions of the system 100. As shown, in addition to the device interface 120, the discovery engine 130 includes a manager module 133, a synchronization module 131, a notification module 132, and a database interface 140.

The ecosystem 100 further comprises a group-sourced contact directory database 150, which is coupled with the discovery engine 130 via the database interface 140 of the discovery engine 130. One should appreciate that the roles or responsibilities of the various illustrated components can be deployed or distributed across one or more suitably configured computing devices. For example, any one of the user devices 106-110 can include device interface 120, discovery engine 130, database interface 140 and group-sourced contact directory database 150. It is also contemplated that any one of the user devices 106-110 could comprise one or more applications (e.g., a mobile application, etc.) that configure the user device to couple with the device interface 120 over a network (e.g., the Internet, a cellular network, WAN, VPN, LAN, a personal area network, Wi-Fi Direct, DLNA, peer-to-peer, ad hoc, mesh, etc.). It is further contemplated that discovery engine 130 and group-sourced contact directory database 150 are located in at least two separate, but communicatively coupled, computing devices.

The contacts directory database 150 stores different contact directories and their associated information, as explained further below. The group-sourced contact directory database 150 in some embodiments can be implemented within the discovery engine 130 while in other embodiments can be communicatively coupled with the discovery engine 130 over a network (e.g., the Internet, a local area network, a wide area network, etc.). In some embodiments, each user device (106-110) also includes a discovery client (161-165) programmed to perform one or more features of the discovery system 100 and communicate with the discovery engine 130 via the device interface 120.

The user devices 106-110 are illustrated as smart phones, but a user device may more generally be, for example, another type of digital device, such as a cell phone, a tablet, a digital organizer, a game console, a computer, a digital camera, an appliance, a kiosk, a global positioning system (GPS) device, or a biometric device, which has a memory to store contacts and programming instructions, and at least one processor for executing the programming instructions. The user devices 106-110 can further include one or more sensors (e.g., a WiFi signal strength meter, a GPS sensor, an accelerometer, etc.), which can be used to detect the location of the devices 106-110.

In some embodiments, a user device (e.g., user devices 106-110) is associated with unique identifiers (e.g., a telephone number, an email address, a social network ID, etc.) of a user, such that the user device can be uniquely identified by the unique identifier. In some embodiments, the unique identifier associated with the user device is part of a person's contact information. For example, as shown in FIG. 1, user device 106 is associated with a phone number that belongs to person 101 (Alan), user device 107 is associated with a phone number that belongs to person 102 (Beth), user device 108 is associated with a phone number that belongs to person 103 (Chuck), user device 109 is associated with a phone number that belongs to person 104 (Dora), and user device 110 is associated with a phone number that belong to person 105 (Zack). Even though each of the user devices 106-110 is associated with a different phone number and a different person in the example of FIG. 1, it is also contemplated that one user device can be associated with multiple phone numbers and/or multiple persons, or one person is associated with multiple user devices. In some embodiments, contact information that is used to associate a user device with a person can be a contact identifier for any type of communication medium (e.g., a telephone number, an e-mail address, a social media handler, a social network ID, a URL, etc.).

As a common practice, a person (e.g., persons 101-105) stores contact information for contacts (e.g., representing family, friends, co-workers, vendors, colleagues, etc.) in a persistent memory or a removable memory of a device associated with that person (e.g., a hard drive, a flash memory, etc.). In other embodiments, a person's contacts may be stored in an online storage space (e.g., Google Cloud™, iCloud™, Box™, etc.) accessible via a network. The user devices (e.g., user devices 106-110) also provide an interface for a person to retrieve contacts from memory and edit the contacts (e.g., add a new contact, remove a contact, edit contact information, etc.).

By way of example, as shown in FIG. 1, user device 109 stores contacts labeled Chuck, Ellie, and Frank, and user device 110 stores contacts labeled Jacob, Molly, and Nancy.

In conventional contact organization systems, contact information is generally stored under a flat organizational structure (i.e., all contact information is stored on the same level). It is contemplated that a flat organization structure does not provide meaningful relationships among the contacts. Thus, in some embodiments, the discovery client of each user device is programmed to provide a user interface that enables the person corresponding to the user device to create and manage one or more contact directories for organizing the contacts. A contact directory is a data structure that includes metadata and encapsulates contact information of a group of contacts. For example, as shown in FIG. 1, user device 106 stores contacts labeled Alan, Beth, and Chuck, and groups the contacts Alan, Beth, and Chuck into a contact directory labeled Group X. The metadata of a contact directory can include context criteria of the corresponding contact directory that characterizes the contacts within the corresponding contacts directory (e.g., UCLA graduate of 2001, Smith's family, Acme Company, etc.). For example, a contact directory labeled "EZ Dancing Club" may have a context criterion of "EZ Dancing Club members," indicating that all contacts within the EZ Dancing Club contact directory are members of the EZ Dancing Club.

Contact directories may be shared among user devices. Shared contact directories in the individual user devices (e.g., user devices 106, 107, 108) are synchronized with each other. Synchronization may occur, for example, periodically, or when requested, or when an offline device comes online. In an example of establishing and group-sourcing a shared contact directory, with reference to FIG. 1, Alan creates a contact directory called "Group X" for storing contacts representing persons graduating from University of California, Irvine in the year of 2015, and adds a context criterion of "UCI Class of 2015" to the contact directory. As shown, Alan added contacts for himself, Beth, and Chuck in this contact directory either by adding existing contacts to the "Group X" contact directory, or by creating new contacts and copying the contacts into the contact directory, or by creating new contacts within the "Group X" contact directory. Contacts and contact information may be entered via a user interface of the discovery client 161 (e.g., discovery client 161 of user device 106).

In some embodiments, the discovery client (e.g., discovery client 161) can allow a person (e.g., person 101) to designate a contact directory as private or shared. If the contact directory is designated as "private," the information stored within the directory, including the contacts' names and contact information will be limited to access by person 101 via user device 106. On the other hand, if the contact directory is designated as "shared," the contact directory will be shared and accessible by all members of the directory.

Thus, when Alan designates the "Group X" contact directory as "shared," the discovery client 161 is programmed to send data associated with the "Group X" contact directory (e.g., directory name, directory context criteria, contacts' names, contact information, contact attributes, etc.) to the discovery engine 130 via the device interface 120. When the discovery engine 130 receives a new contact directory from a user device, the manager module 133 is programmed to first determine if a contact directory with the same name exists in the contact directory database 150, and if not, store the data associated with the new contact directory in the contact directory database 150 via the database interface 140. In addition, the manager module 133 is also programmed to use the notification module 132 to transmit a notification to other members of the newly created contact directory. In this example, since "Group X" contact directory includes contacts Alan, Beth, and Chuck, when the data associated with the "Group X" contact directory is received by the discovery engine 130 from user device 106 (i.e., the user device associated with member Alan, the notification module 132 is programmed to transmit a notification to discovery clients 162 and 163 of user devices 107 and 108, respectively, based on the contact information associated with contacts Beth and Chuck in the "Group X" contact directory. In some embodiments, the notification includes a message that notifies the member of the addition to a "shared" contact directory, and the notification may also provide information about the contact directory (e.g., directory name, context criteria, other contacts' names, etc.).

In some embodiments, the discovery clients 162 and 163 is also programmed to download the "Group X" contact directory from the discovery engine 130 and store the "Group X" contact directory in a local persistent memory (e.g., local hard drive) of the user devices 107 and 108, respectively, such that the members represented by the contacts (e.g., Beth and Chuck) can continue to access the directory through their user devices 107 and 108, respectively.

Once a contact directory becomes "shared," the content of the contact directory will be group-sourced. In the "Group X" example above, since the "Group X" contact directory includes Alan, Beth, and Chuck, the discovery system 100 enables all of the members of the "Group X" contact directory, namely, persons represented by the contacts Alan, Beth, and Chuck, to contribute to the content of the "Group X" contact directory. Thus, the discovery engine 130 of some embodiments instructs the discovery clients 161, 162, and 163 to give access to the members represented by contacts Alan, Beth, and Chuck to add, remove, and otherwise edit information related to the "Group X" contact directory. The discovery engine 130 is programmed to allow the members represented by contacts Alan, Beth, or Chuck to add a new contact to the "Group X" contact directory, to remove a contact from the "Group X" contact directory, and to edit any contact information within the "Group X" contact directory. This way, Alan, who is the creator of the "Group X" contact directory, does not have to know the contact information for everyone who is graduating from UCI in 2015, because he can rely on Beth, Chuck, and any future new members added to the "Group X" contact directory to update and maintain the "Group X" contact directory.

For example, if Chuck is aware that another person, Dora, is also a 2015 graduate of UCI, Chuck can use the user interface provided by the discovery client 163 to add contact Dora and contact information for Dora to the "Group X" contact directory. Once the discovery client 163 receives the new contact from the user device associated with Chuck, the discovery client 163 is programmed to transmit data associated with the new contact Dora (e.g., name of the "Group X" contact directory, label of contact (Dora), contact information of contact Dora, etc.) to the discovery engine 130 via the device interface 120.

After receiving data associated with the new contact Dora, the manager module 133 is programmed to update the "Group X" contact directory stored in the contact directory database 150 by adding this new contact Dora and associated contact information to the "Group X" contact directory. The synchronization module 131 is programmed to synchronize the "Group X" contact directory across the user devices 106, 107, 108, and 109 associated with the members of the "Group X" contact directory. In some embodiments, the synchronization module 131 is programmed to send only the delta (i.e., the last changes being made to the directory) to the user devices 106, 107, 108, and 109, while in other embodiments, the synchronization module 131 is programmed to send the complete data of the most updated version of the "Group X" contact directory to the devices. As the discovery clients 161, 162, 163, and 164 receive the synchronization data from the synchronization module 131, the discovery clients 161, 162, 163, and 164 are programmed to update the local copy of the "Group X" contact directory. It is noted that according to some embodiments, only the members of the "Group X" contact directory have access to the "Group X" contact directory (e.g., to view and edit information of the "Group X" contact directory) and user devices not associated with members of the "Group X" contact directory (e.g., user device 110 of person 105 (Zack)) does not have access to the "Group X" contact directory, unless and until Zack is also added to the "Group X" contact directory by one of the members.

It is contemplated that a notification can only reach to a user device after a discovery client is installed on the user device and, in some embodiments, the notification can only reach the user device after a person associated with the user device "signs up" to the service through the discovery client. Thus, in some embodiments, when a discovery client is initially installed on a user device, the discovery client is programmed to send a signal to the discovery engine 130 with a contact identity of the person associated with the device (e.g., a telephone number, an e-mail address, etc.). The discovery engine 130 is then programmed to query the contact directory database 150 to retrieve information related to contact directories to which the person was previously added as a member (e.g., by another member), and to send information regarding those contact directories (e.g., name of directory, context criteria, contacts, contact information, etc.) to the discovery client, so that the client can notify the new person via the user interface. In some embodiments, information regarding the contact directories is sent to the discovery client based on pre-assigned access rights.

In some embodiments, when the notification module 132 determines that a person who is a target of a notification has not installed a discovery client on a user device associated with the person, the notification module 132 is programmed to send an invitation (e.g., via SMS, e-mail, social media, etc.) to invite the person to install the discovery client, by using contact information of that person from a contact directory in the contacts directory database 150. In embodiments in which a sign-up is required before access to the contacts directory database 150 is granted, the invitation may further invite the person to join the discovery community. A person receiving an invitation may at any time later install the discovery client and sign up, to allow the person to discover contact directories in which the person is listed using the discovery engine 130.

When multiple members in a directory have access to update/edit information of the directory, it is foreseeable that several problems (e.g., conflicts, access rights, etc.) may arise. The discovery engine 130 of some embodiments includes the following features to address these issues. In some embodiments, the discovery engine 130 is programmed to reconcile a conflict arising from inconsistent edits by multiple persons, by using data such as time stamps (e.g., based on the time of the last synchronization, based on the local time of the device, etc.). A conflict may be reconciled be rewinding to a previous version of a contact directory. For example, if a first member of a shared contact directory makes an update to information regarding a contact in a shared contact directory at a first time, but is not online at that first time, the shared contact directory will not be updated at that time. At a subsequent second time in the example, a second member makes a conflicting update to information related to the same contact in the shared contact directory while online such that the conflicting update is synchronized to user devices of members online at about the second time. In this example, when the first member comes online at a third time, the older update created at the first time will be used to update the shared contact directory, which will be synchronized to user devices of members online at about the third time. The discovery engine 130 may detect the conflict, and revert back to the earlier version of the shared contact directory from the second time (before the update from the first time was incorporated).

The discovery engine 130 of some embodiments is programmed to create a hierarchy among members, where some members have higher priority than others (e.g., the edits performed by a member with higher priority will generally be preserved), or where there are different editing rights assigned for different members. In addition, some editing rights of some members may be disabled following a reported abuse. Further, a member may undo an edit of another member. In some embodiments, limits on editing rights may be implemented. In addition, in some embodiments, the limits may be implemented for some rights and not for others. For example, a right to delete a contact may be subject to approval or consent from at least another member before taking effect, while a right to add, or a right to edit, contact information may not be subject to approval or consent from another member before taking effect.

In other embodiments, each contact directory may comprise a list of negative keywords to prevent a deleted item from reappearing (i.e., once a negative keyword is added to the list in a contact directory, that negative keyword is prevented from being entered in the contact directory). Negative keywords can be added by members, or by the system. A negative list may alternatively or additionally be added at the contact level or at the contact information level. Through the use of negative keywords, old or incorrect information does not get back in the system.

In some embodiments, the discovery client of a user device is also programmed to automatically add new contacts to existing contact directories accessible by the user device. In some of these embodiments, one or more contacts stored on a user device includes attributes (e.g., a position, a job, a location, a relationship, an interest, an affiliation, etc.) in addition to contact information. For example, with reference to FIG. 1, attributes related to person 102 (Beth) that are stored in user devices 106, 107, and 108 may include Beth's job position (e.g., a dancing teacher, etc.), Beth's affiliation (e.g., EZ dancing club, etc.), and Beth's location (e.g., Santa Monica, Calif.). Similarly, attributes related to person 103 (Chuck) that are stored in user devices 106, 107, and 108 may have Chuck's relationship with Beth (e.g., a high school classmate, etc.) and Chuck's interest (e.g., salsa dancing, etc.). The discovery client is programmed to obtain some of these attributes from a person directly, while extracting some of these attributes from the contact information. For example, the discovery client is programmed to extract information about an organization to which a person belongs (e.g., a company name, etc.) from an e-mail address.

As mentioned above, a contact directory may include context criteria that describe characteristics of its members. As such, the discovery client of some embodiments is programmed to, for each contact stored on the user device, determine to which directories that the contact could be added, by comparing the attributes of the contact and the context criteria of the contact directories. The discovery client is programmed to add the contact to the determined contact directories, and synchronize those contact directories with the discovery engine 130 and user devices associated with other members of the contact directories. For example, if the discovery client 164 of user device 109 determines that Frank is also a graduate from UCI in 2015 (based on an e-mail address and other information), the discovery client 164 is programmed to add Frank to the "Group X" contacts directory, and send this update to the discovery engine 130. The synchronization module 131 is then programmed to communicate with user devices of other members of the "Group X" contacts directory, namely, Alan, Beth, and Chuck, and update their local version of the "Group X" contact directory. In addition, the notification module 132 is programmed to notify Frank of his inclusion in the "Group X" contact directory and enable Frank to access and edit information in the "Group X" contact directory via a discovery client on his associated user device.

In addition to adding new contacts to existing directories, the discovery engine 130 is programmed to also use contact information from one contact directory to update the contact information of a different contact directory. When the discovery engine 130 identifies a contact in one contact directory (e.g., a "private" directory) that matches a contact in a different contact directory (e.g., a "shared" directory), for example by matching phone numbers, the discovery engine 130 is programmed to update contact information in the shared contact directory using contact information in the private contact directory, and also update contact information in the private contact directory using contact information in the shared contact directory. In one example, Beth's contact information in the shared "Group X" contact directory in user device 106 includes her job title as a teacher but does not have any affiliation information, while Beth's contact information in Alan's private contact directory in his associated user device 106 includes Beth's affiliation with EZ Dancing Club, but does not have any job information. The discovery client 161 is programmed to update Beth's contact information in the shared "Group X" contact directory to include her affiliation information and update Beth's contact information in Alan's private contact directory to include her job information.

Instead of adding the contacts to or updating the contacts in the relevant contact directories automatically, the discovery client of some embodiments is programmed to make a recommendation to a corresponding member via the user interface first, and enable the member to select whether he or she wants to make the addition and update.

It is contemplated that contact directory database 150 stores multiple contact directories. As shown in FIG. 1, contact directory database 150 includes contact directory 151 (e.g., the "Group X" contact directory), "Group Y" contact directory 152 that includes contacts Fitz, George, Harry, Indira, and Alan, and "Group Z" contact directory 153 that includes contacts Jacob, Kris, Lewis, and Mona. The manager module 133 is programmed to control access to the contact directories, and work with synchronization module 131 and notification module 132 to ensure that the user devices associated with the members of each directory have the most up-to-date version of the contact directory and are notified of their inclusion in a different contact directory. It is also noted that a benefit of the system described herein allows for the "discovery" aspect of these contact directory by new members. In conventional systems where each person controls their own version of a contact list, the contacts in the person's list are not aware that they are being added to the person's list and that the contacts cannot edit their own information in the person's list.

On the other hand, the discover system disclosed herein ensures that any new member to a directory is notified of inclusion in a contact directory, and that the new member can edit his/her own contact information as well as editing other members' contact information. This functionality gives rise to a feature that a person can put forth different contact information (e.g., a different phone number, a different e-mail address, etc.) for different contact directories to which the person belongs. For example, since Alan is a member for both directories 151 and 152, Alan can have different phone numbers to be shown in directories 151 and 152 (e.g., a personal phone number for a friends/family-related directory and a business phone number for a business-related directory).

In some embodiments, the discovery engine 130 is programmed to merge multiple contact directories that share common context criteria to create new contact directories, and also divide a contact directory into multiple contact directories. As mentioned above, a contact directory stored in the contacts directory database 150 may include one or more context criteria that characterize the contacts within the contact directory. In some embodiments, the contact directories are indexed by their context criteria for retrieval speed. The discovery engine 130 of some embodiments is programmed to traverse the contact directories within the contacts directory database 150 to discover contact directories with common context criteria. For example, a contact directory with context criteria of "CMU" and "Class of 2015" and a contact directory with context criteria of "CMU" and "Class of 2014" share a common context criterion of "CMU." As such, the discovery engine 130 may be programmed to generate a new contact directory by merging the two contact directories, and assign the context criterion of "CMU" to the new contact directory. The discovery engine 130 may be programmed to use the notification module 132 to notify all members of this new "CMU" contact directory of his/her inclusion of the "CMU" contact directory. These members can subsequently use their discovery clients to maintain and update the new "CMU" contact directory.

Additionally, the discovery engine 130 may be programmed to not only analyze the context criteria of the contact directories, but also to analyze attributes of the contacts within each contact directory to determine a need to divide a contact directory into multiple contact directories. For example, if the discovery engine 130 identifies that some contacts within a "CMU" contact directory include an attribute of "Class of 2014", while other contacts within the "CMU" contact directory include an attribute of "Class of 2015," the discovery engine 130 may be programmed to generate two new contact directories, one for "CMU Class of 2015" and another one for "CMU Class of 2014", and add each contact from the "CMU" directory into one of these two new contact directories according to their attributes. Once the two contact directories are generated, the notification module 132 is programmed to notify the members of their inclusion in the new contact directories.

Contact directories can be automatically formed based on specified criteria or filters (e.g., usage, search frequency, etc.). Discovery engine 130 may also provide a search function so that the persons can search for contact directories by specific criteria or contexts.

Figure 2:
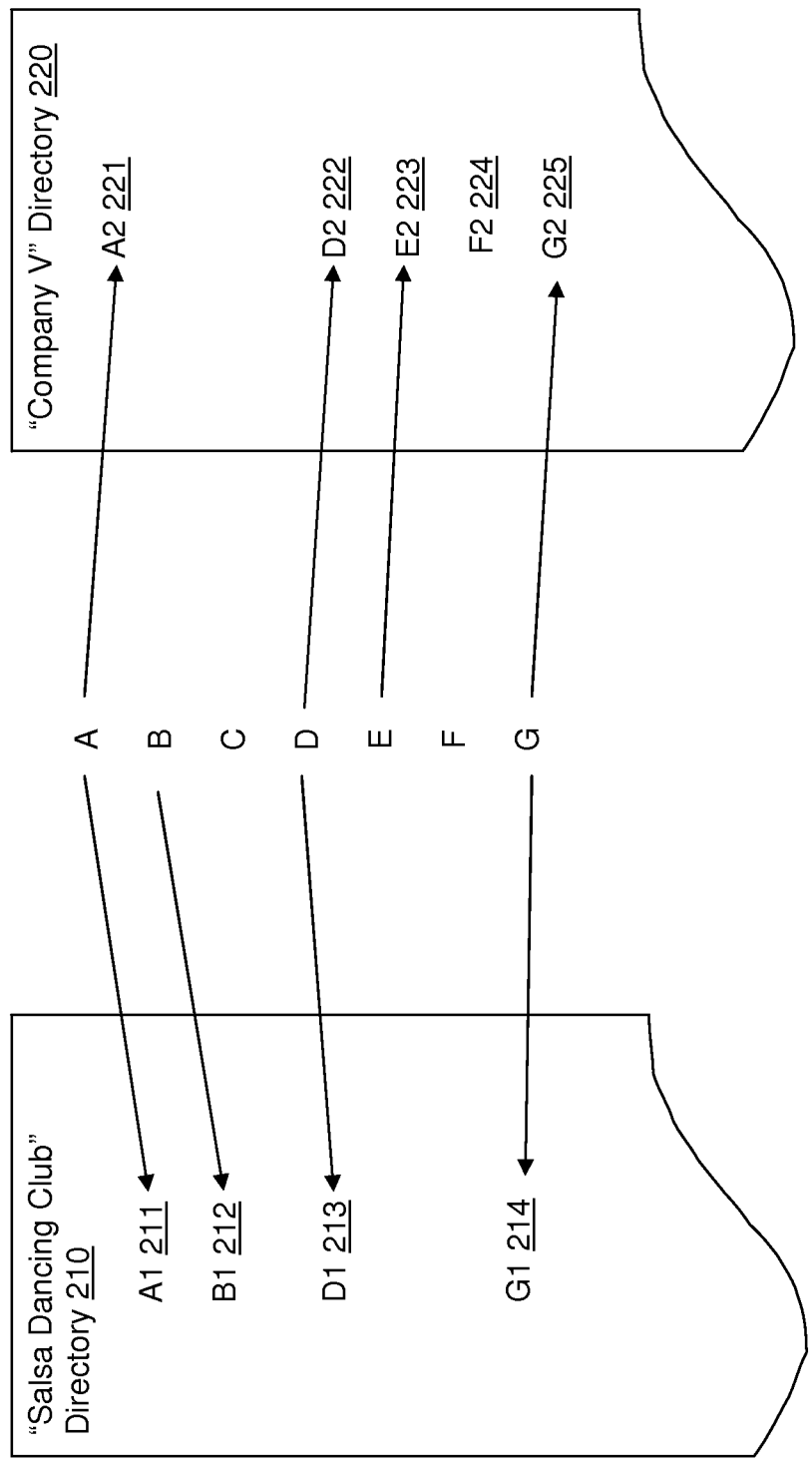
FIG. 2 illustrates an embodiment that allows persons to use different contact information for different directories.

FIG. 2 illustrates two different contact directories, where members have different contact information (i.e., different faces) for the two contact directories. FIG. 2 shows a "Salsa Dancing Club" contact directory 210 and a "Company V" contact directory 220. The "Salsa Dancing Club" contact directory 210 has members including A, B, D, and G, while "Company V" contact directory 220 has members including A, D, E, F, and G. As such, persons A, D, and G are members in both contact directories 210 and 220. FIG. 2 also shows that person A is shown as contact A1 and uses contact information 211 for "Salsa Dancing Club" contact directory 210, and is shown as contact A2 using contact information 221 for "Company V" contact directory 220. Person D is shown as contact D1 and uses contact information 213 for "Salsa Dancing Club" directory 210, and is shown as contact D2 using contact information 222 for "Company V" contact directory 220. Person G is shown as contact G1 and uses contact information 214 for "Salsa Dancing Club" directory 210, and is shown as contact G2 using contact information 225 for "Company V" directory 220.

Figure 3:
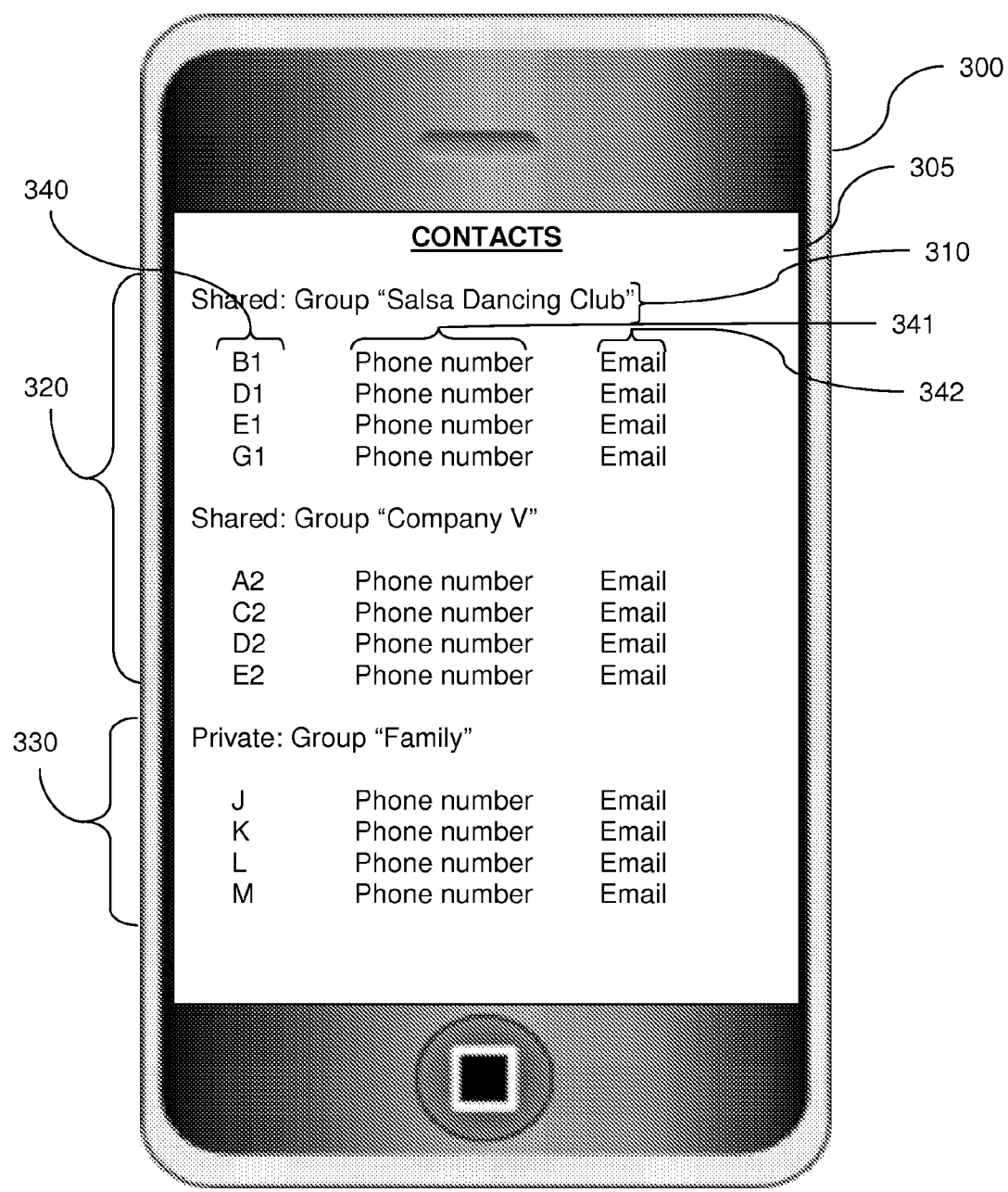
FIG. 3 illustrates an example user interface of a contacts directory client.

FIG. 3 shows an example of a user interface 305 provided by a discovery client. In FIG. 3, the user interface 305 displays a list of contacts that is stored on or accessible by the user device 300. As shown, the list of contacts includes three contact directories: a "Salsa Dancing Club" contact directory, a "Company V" contact directory, and a "Family" contact directory. Additionally, the "Salsa Dancing Club" contact directory and the "Company V" contact directory have been designated as "shared" contact directories, while the "Family" contact directory has been designated as "private". FIG. 3 also shows contact information for contacts in each contact directory. Even though names 340, phone numbers 341, and e-mails 342 are displayed in this example interface 305, it is contemplated that other information (e.g., organization, relationship, etc.) can also be displayed.

Figure 4:
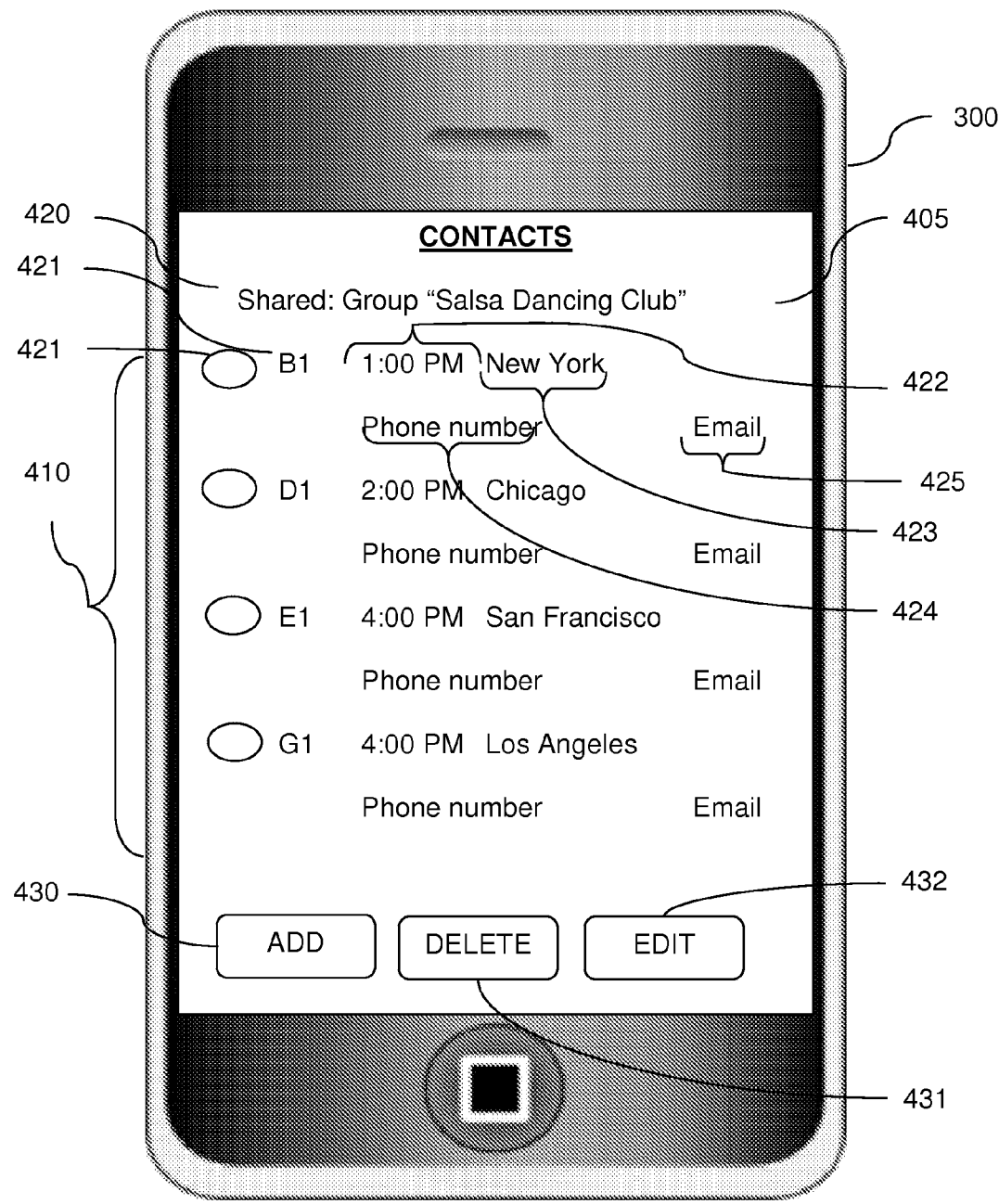
FIG. 4 illustrates another example user interface of a contacts directory client.

FIG. 4 shows an example of a user interface 405 of a discovery client in user device 300. User interface 405 allows a person to edit contact information in a shared contact directory, such as the "Salsa Dancing Club" contact directory shown. As shown, the user interface 405 includes selection radio buttons such as selection radio button 421 for selecting a contact from contacts in the contact directory, an add button 430 for adding a new contact to the "Salsa Dancing Club" contact directory, a delete button 431 for removing a selected contact from the "Salsa Dancing Club" contact directory, and an edit button 432 for editing contact information of a selected contact.

In addition, user interface 405 also includes (for each contact in this example) a display area (e.g., display area 422) to indicate a local time, and a display area (e.g., display area 423) to indicate a current location of the contact. In some embodiments, each user device includes a location determination module (e.g., a GPS module) that determines a geographical location of the user device. The discovery client of each user device is programmed to periodically send the detected geographical location of the user device to the discovery engine 130. Upon receiving the geographical locations from different user devices, the discovery engine 130 is programmed to determine a local time for each user device and store both the location and the local time in the contacts directory database 150. The synchronization module is also programmed to propagate the location and the local time information to all user devices such that each user device has the location and local time information for contacts stored in the user device. The location and local time information can be useful when a person considers communicating with another person, such that the person knows the communication is not at an inconvenient time. In some embodiments, the local time of a contact may be estimated based on contact information of the contact through reverse lookup of area code, mobile number or address.

In some embodiments, user interface 405 includes the ability to archive contacts in a contact directory or hide contact directories to remove them from primary contact search for daily use.

Thus is described a system in which contact information of contact directories is group-sourced. A contact directory includes contact information of multiple members of the directory. In some embodiments, all members within a group-sourced directory have access to the contact information of the directory. Specifically, each member of the directory can add new contacts, remove contacts, and edit contact information of any contact within the directory. Thus, a benefit of the group-sourced contact directory of this disclosure is that the distribution of a burden of maintaining and updating the contact directory is shifted from one person to some, or all, members of the contact directory In addition, when a new contact is added to a directory, a person represented by the new contact automatically becomes a member of the directory. The new member is notified of his/her inclusion in the directory. In some embodiments, the new member is provided latent access to the contact information of other members in the directory, such that the new member can edit his/her own contact information or other members' contact information within the directory.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A group-sourced contact directory comprising:
a group-sourced database storing a plurality of contact directories including at least a first contact directory, a second contact directory and a third contact directory, each contact directory comprising contact information of a plurality of members;
the first, second and third contact directories being different from each other but sharable, such that a person represented as a contact stored in the first contact directory is a member of the first contact directory and has viewing and editing privileges to contact information in the first contact directory and also the privilege to mark the first contact directory as private to prevent non-members of the first contact directory from viewing and editing the first contact directory;
a discovery engine comprising a processor and a memory for storing program instructions, the instructions when executed by the processor cause the processor to perform the steps of:
providing a first interface on a first user device for a first person to add a second person's first contact information to the first contact directory, wherein the first contact information uniquely identifies the second person using a unique identifier;
in response to the addition of the second person's first contact information to the first contact directory:
(1) granting the second person with privileges to both view and edit contact information of members of the first contact directory, where said privileges were denied prior to the addition of the second person's first contact information to the first contact directory;
(2) adding to the first contact directory additional contact information associated with the second person by:
searching, using a discovery engine, the group-sourced contact directory database for the unique identifier to identify at least the second contact directory, wherein the second contact directory includes additional contact information associated with the unique identifier associated with the second person, and
adding additional contact information associated with the second person to the first contact directory from the second contact directory, in response to the discovery engine finding the unique identifier in the second contact directory;
(3) in response to the discovery engine finding a third person's first contact information in the second contact directory, adding to the second contact directory additional contact information associated with a third person from the third contact directory, and granting the third person with privileges to both view and edit contact information of members of the second contact directory, where said privileges were denied prior to the addition of the third person's first contact information to the second contact directory;
in response to finding the unique identifier in the second contact directory and determining that a discovery client is installed on a second user device associated with the second person to receive discovery notifications, said discovery engine dynamically and without any user action transmitting a discovery notification to the second user device, said discovery notification comprising information identifying the second contact directory that comprises contact information of the second person;
in response to finding the unique identifier in the second contact directory and determining that the discovery client is not installed on the second user device to receive discovery notifications, said discovery engine dynamically and without any user action transmitting an invitation to the second user device to install the discovery client;
receiving a request to remove a first contact associated with the first person from the first contact directory; and in response to removing the first contact from the first contact directory, disabling editing rights to the first contact directory from the first person;
wherein, upon an update of an identified shared contact directory by a member of the identified contact directory, contact data in the contact directory is synchronized with all shared contact directories that are associated with the members of the identified contact directory; and wherein the identified contact directory is associated with a context criteria that defines contacts that belong to said identified contact directory such that a new user is added to said identified contact directory upon comparison of one or more attributes of said new user with respect to the context criteria.

2. The system of claim 1, wherein the editing rights comprise any or a combination of a right to add a new fourth contact to the first contact directory, a right to remove the first contact from the first contact directory, and a right to edit contact information associated with the first contact.

3. The system of claim 1, wherein addition of the second person comprises adding contact information related to the second person, wherein the contact information includes a phone number.

4. The system of claim 1, wherein the plurality of contact directories were inaccessible by the second person before the second person's first contact information was added to the contact directory.

5. The system of claim 1, wherein the request is received from the second user device.

* * * * *